United States Patent [19]

Lucas

[11] Patent Number: 4,928,889
[45] Date of Patent: May 29, 1990

[54] WATERING SYSTEM FOR GREENHOUSE

[75] Inventor: Gary H. Lucas, Hightstown, N.J.

[73] Assignee: Integrated Tech Systems, Inc., Windsor, N.J.

[21] Appl. No.: 292,376

[22] Filed: Dec. 30, 1988

[51] Int. Cl.$^5$ .................................. A01G 25/09
[52] U.S. Cl. ............................. 239/751; 239/726; 239/743; 47/17; 137/355.16
[58] Field of Search ............... 239/750, 751, 753, 734, 239/736, 735, 743, 744; 47/17; 137/355.16, 355.2, 355.21, 355.22, 355.23, 355.25

[56] References Cited

U.S. PATENT DOCUMENTS

| | | |
|---|---|---|
| Re. 25,642 | 9/1964 | Hagelthorn . |
| 1,866,681 | 7/1932 | Taylor . |
| 2,395,485 | 2/1946 | Jones . |
| 2,725,431 | 11/1955 | Rushworth . |
| 2,892,389 | 6/1959 | Schurger et al. . |
| 2,935,080 | 5/1960 | Klimek . |
| 2,940,366 | 6/1960 | Daugherty . |
| 3,653,401 | 4/1972 | Beeler et al. . |
| 3,902,520 | 9/1975 | Gallenberg ............... 137/355.16 |
| 3,961,772 | 6/1976 | Sweeney .................. 137/355.16 |
| 4,074,856 | 2/1978 | Williams et al. . |
| 4,260,191 | 4/1981 | Weber ....................... 137/355.2 |
| 4,723,714 | 2/1988 | Lucas . |
| 4,842,204 | 6/1989 | Debruhl, Jr. .................. 239/751 |

FOREIGN PATENT DOCUMENTS 2838702  3/1979  Fed. Rep. of Germany ............... 137/355.23

Primary Examiner—Andres Kashnikow
Assistant Examiner—Christopher G. Trainor
Attorney, Agent, or Firm—R. Neil Sudol; Henry D. Coleman

[57] ABSTRACT

A water sprinkling system for greenhouse comprises two horizontal rails and a carriage movably mounted to the rails. A fluid outlet disposed at a substantially midway point along the rails is connected to the carriage by a fluid transfer hose for guiding fluid to the carriage from the fluid outlet. The hose has a first end portion extending from the fluid outlet along the first rail, a second end portion extending to the carriage along the second rail, and a middle portion connecting the end portions to one another. Support elements, preferably in the form of hook members, are spaced from one another along the first rail for supporting the first end portion of the hose, while a plurality of roller members are spaced from one another along the second rail for rollably supporting the second end portion of the hose. A hose-car is movably mounted to the rails for carrying the middle portion of the hose. A cable provided for maintaining tension on the hose is operatively connected to the hosecar to exert thereon a force directed along the path of the rails and essentially directly opposed to a force exerted on the hosecar by the hose. Deflectors, preferably in the form of rollers, are provided on the hosecar for deflecting the hose from a first orientation occupied by the first end portion of the hose to a second orientation occupied by the middle portion of the hose and for bending the hose from one rail towards the other, so that the middle portion of the hose is disposed substantially perpendicularly to the first end portion and the second end portion.

32 Claims, 5 Drawing Sheets

WATERING SYSTEM FOR GREENHOUSE

BACKGROUND OF THE INVENTION

This invention relates to a watering system for a greenhouse. More particularly, this invention relates to an overhead sprinkler watering system for greenhouses.

Greenhouse watering system typically comprise a traveling carriage and a conveyance device for delivering water to the carriage from a remote water source. In most commercial automatic water sprinkling systems used in greenhouses today, the conveyance device includes a hose which lays in a trough or on a flat tray disposed alongside the travel path of the carriage and generally composed of synthetic resin material. The hose is dragged along the tray or trough by the carriage and is subjected to tension which varies, depending on the position of the carriage along it travel path and further depending on the portion of the hose under consideration. More particularly, that portion of the hose located at the carriage is subjected to tension varying from zero, when the carriage has just reversed its direction of movement, to a considerable amount, as the carriage approaches an end of its travel path. A major disadvantage of such a water sprinkling system is that reversing the direction of motion of the carriage before the carriage has reached the end limit of its travel path, i.e., before the hose is stretched to its fullest extent, creates kinks and tangles in the hose, with the possible additional result that the hose or a portion thereof is dislodged from the support tray. Accordingly, to avoid such kinks or tangles in the hose, the carriage must always travel to the ends of its path, even if those path ends do not extend over crops requiring water.

Further disadvantages of the above-described water sprinkling system are that the varying tension on the hose causes variations in the travel speed of the carriage, thereby varying the amount of water applied, and greatly stretches the hose, which periodically necessitates cutting of the hose and of any electrical wiring which may be contained therein. In addition, the friction between the hose and the tray increases the power consumption of the carriage driving machinery and results in a relatively rapid wearing of the hose material.

In another kind of automatic sprinkling system for greenhouses, the water delivery hose is alternately wound on and unwound from a spool or reel as a hose-car reciprocates along a rail or track. For example, U.S. Pat. No. 4,723,714 to Lucas discloses a programmable sprinkler system comprising a carriage or hosecar which travels alternately along each of a plurality of parallel overhead rails extending perpendicularly from a common rail. The hosecar is moved from one overhead rail to another by a carrier mechanism shiftably disposed on the common rail. The hosecar supports a reel housing upon which a hose is wound. The hose is connectable at one end to a valve located at the conjunction of the common rail and a respective overhead rail. As the hosecar travels outwardly from the common rail along an overhead rail, the hose is unwound from the reel housing.

U.S. Pat. No. 4,074,856 to Williams et al. also discloses a greenhouse watering apparatus wherein a rotary reel supported by a translating carriage reels in or unreels a flexible water delivery hose.

An automatic sprinkling system incorporating a hose reel, although desirable for some applications, has certain disadvantages in other applications. For example, because essentially the entire hose, together the reel and ancillary mechanisms, is supported by a sprinkling carriage, there are inherent limitations as to the distance which can be covered by the carriage and, consequently, restrictions on the sizes of the greenhouses in which the sprinkling system is utilizable.

OBJECTS OF THE INVENTION

An object of the present invention is to provide an improved greenhouse watering system which is capable of conveying water and other fluids over long distances.

Another object of the present invention is to provide a greenhouse watering system having a water delivery hose which is subjected to minimal wear and concomitantly has an increased lifespan.

Another object of the present invention is to provide such a greenhouse watering system having a traveling carriage to which an end of the water delivery hose is attached, wherein the carriage may change its travel direction prior to reaching an end limit of its path, without kinking or tangling the hose.

Yet another object of the present invention is to provide such a greenhouse watering system wherein tension forces applied to the hose for moving it are minimized and controlled to remain within a limited rang of values.

A further object of the present invention is to provide such a greenhouse watering system wherein power required for pulling a hose is reduced.

SUMMARY OF THE INVENTION

A sprinkler watering system for a greenhouse comprises, in accordance with the present invention, a first horizontal rail and a second horizontal rail extending parallel to one another to define an elevated path in the greenhouse, a carriage movably mounted to the rails, a fluid outlet disposed at a substantially midway point along the path of the rails, and a fluid transfer hose for guiding fluid from the fluid outlet to the carriage. The hose is connected at one end to the fluid outlet and at an opposite end to the carriage and has a first end portion extending from the fluid outlet along the first rail and a second end portion extending to the carriage along the second rail. The hose further has a middle portion connecting the first end portion to the second end portion. Support elements, preferably in the form of hook members, are spaced from one another along the first rail for supporting the first end portion of the hose, while a plurality of roller members are spaced from one another along the second rail for rollably supporting second end portion of the hose. A hosecar is movably mounted to the rails for transferring the hose from hook members along the first rail to roller members along the second rail. A cable provided for maintaining tension on the hose is operatively connected to the hosecar to exert thereon a force directed along the path of the rails and essentially directly opposed to a force exerted on the hosecar by the hose.

In accordance with another feature of the present invention, deflectors, preferably in the form of rollers, are provided on the hosecar for deflecting the hose from a first orientation occupied by the first end portion of the hose to a second orientation occupied by the middle portion of the hose and for deflecting the hose from the second orientation to a third orientation occupied by the second end portion of the hose, so that the middle portion of the hose is disposed substantially perpendicularly to the first end portion and the second end portion.

Pursuant to further features of the present invention, the cable is partially wound about rollers on the hosecar and has one end fixedly attached at an end of one of the two rails and an opposite end secured to the carriage to exert thereon a force directed along the path and essentially directly opposed to a force exerted on the carriage by the hose.

In a preferred embodiment of the present invention, the cable has a first segment extending along one of the rails, preferably the first rail, from a first stationary point at one end of the first rail. A second segment extends across the hosecar substantially parallel to the middle portion of the hose, while a third segment extends along the second rail to a second stationary point at an end of the second rail. A fourth segment of the cable extends from the second stationary point along the second rail to a third stationary point at another end of that rail, a fifth segment extending essentially parallel to the second rail from the third stationary point to the carriage.

In accordance with another feature of the present invention, the cable is supported entirely by the support hooks along the first rail and partially by the support rollers along the second rail. Preferably, the cable is partially wound about pulleys at the second stationary point and the third stationary point.

Pursuant to another feature of the present invention, the deflector rollers are provided in two arcuately disposed arrays.

A plurality of support frames may be provided for suspending the first rail and the second rail from the ceiling superstructure of a greenhouse, each support frame including a plurality of pairs of drop pipes. The support frames are spaced from one another along the rail path. Each support frame further includes a pair of C-shaped hangers attached to the drop pipes, the rails, the pulley members and the roller members being secured to the C-shaped hangers.

A greenhouse watering system in accordance with the present invention is capable of conveying water and other fluids over long distances and has a water delivery hose which is subjected to minimal wear and which, for that reason, has a long lifespan. In a greenhouse watering system pursuant to the present invention, tension forces applied to the hose for moving it are minimized and controlled to remain within a limited range of values. Moreover, the power required for pulling the hose is reduced.

DETAILED DESCRIPTION

Figure 1:
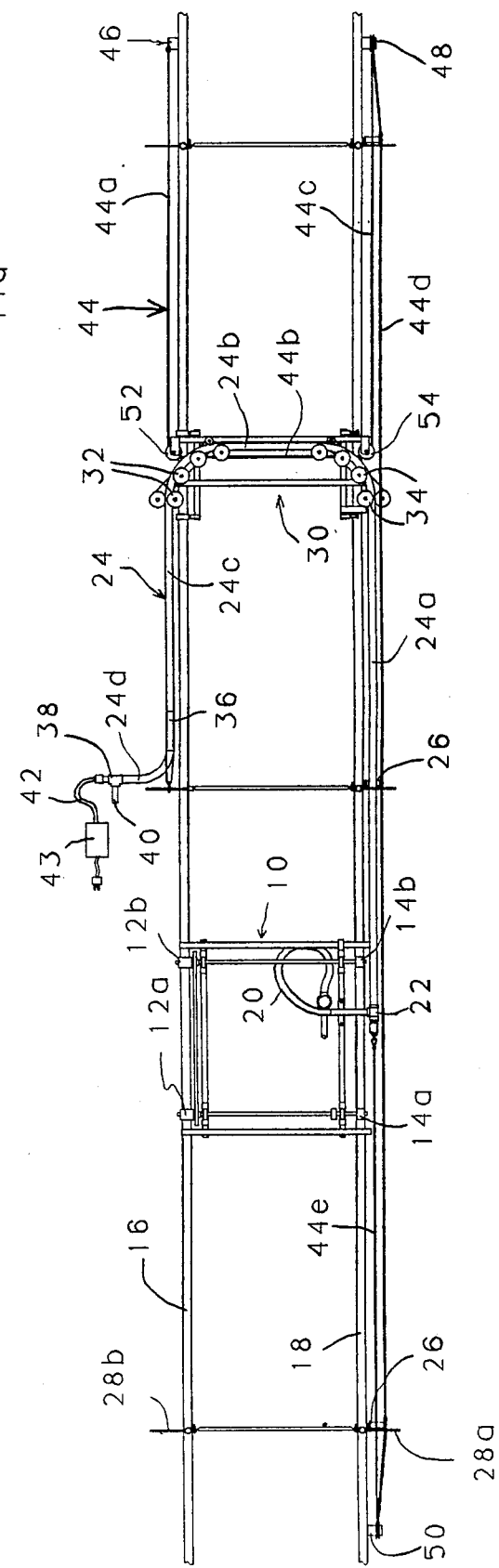
FIG. 1 is a top view of a greenhouse watering system in accordance with the present invention, showing a water delivery hose extending from a water source over a hosecar to a carriage, and a tension cable connected to the hosecar and the carriage for maintaining tension in the water delivery hose pursuant to the present invention.
Figure 5:
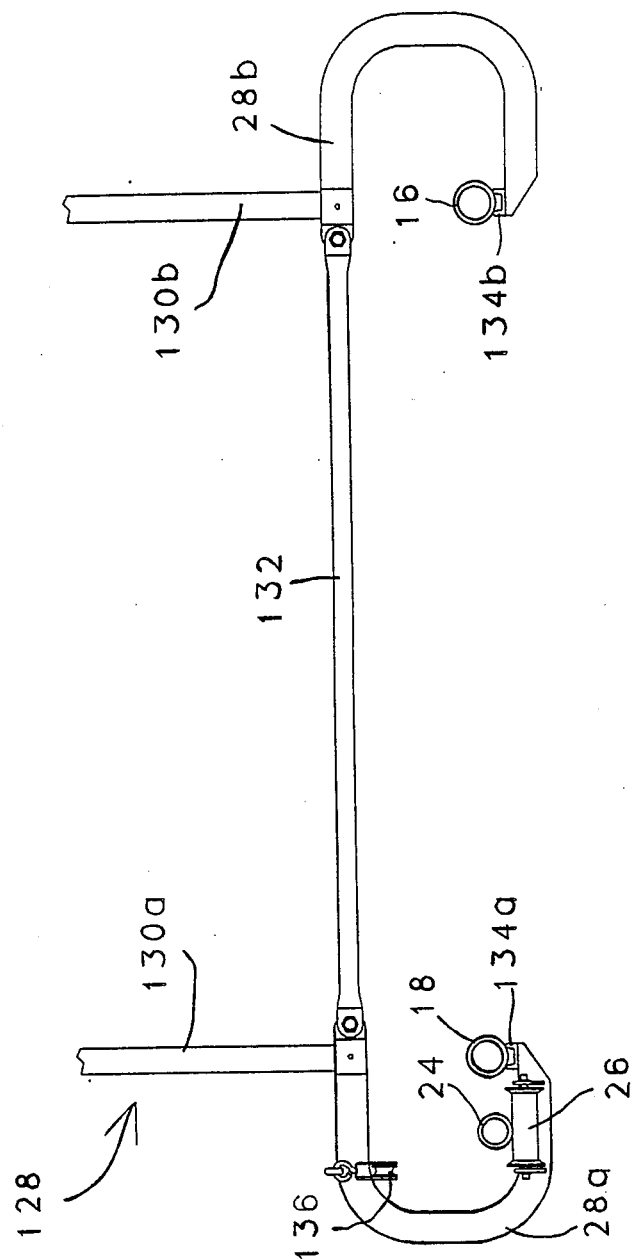
FIG. 5 is an elevational view, taken from a rearward side, of a support frame or rail hanger of the greenhouse watering system of FIG. 1.

As illustrated in FIG. 1, a greenhouse watering system includes a watering carriage 10 shiftably mounted via a first pair of rollers 12a and 12b and a second pair of rollers 14a and 14b to two parallel rails 16 and 18 for longitudinal motion along the rails. Carriage 10 is provided with an intake tube 20 connected via a coupling 22 to the outlet end of a water delivery or feed hose 24. A first segment 24a of feed hose 24 extends substantially parallel to rail 18 and is supported at substantially equispaced intervals along that rail by a plurality of rollers 26 rotatably supported, as depicted in FIG. 5, at the bottom ends of respective C-shaped hangers 28a.

Figure 2:
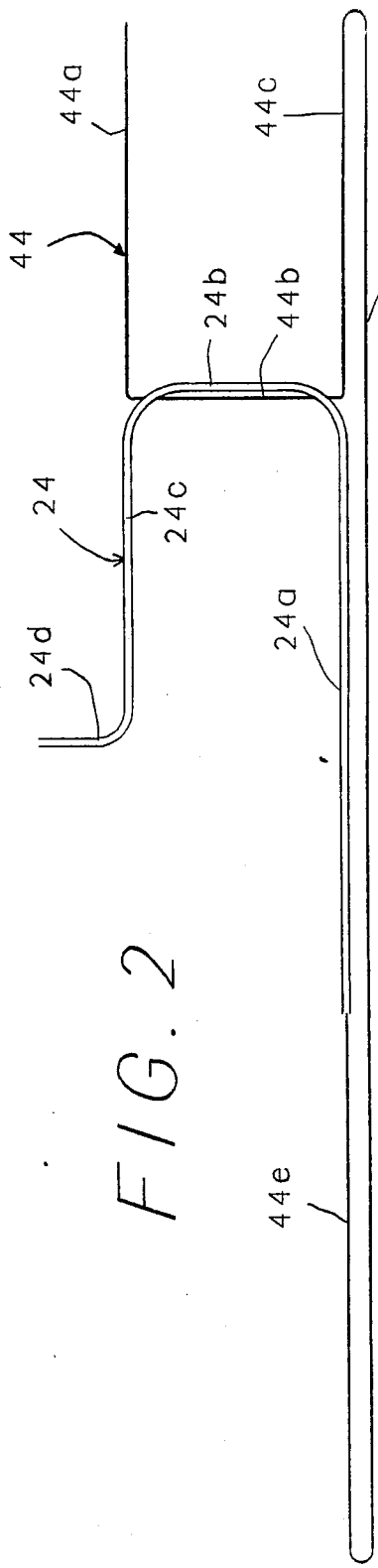
FIG. 2 is a diagram of the water delivery hose and the tension cable of FIG. 1, showing the respective configurations of those two elements when the hosecar and the carriage occupy the positions depicted in FIG. 1.

As shown in FIGS. 1 and 2, hose 24 turns inwardly towards rail 16 at the end of first hose segment 24a opposite the outlet end of the hose. A second segment 24b of the feed hose extends from one rail 18 to the other rail 16 and is supported by a hosecar 30 rollably mounted to the rails. Opposite ends of the transverse second hose segment are bent or deflected along arcuate paths and engage respective pluralities of guide rollers 32 and 34. A third segment 24c of feed hose 24 extends from hosecar 30 along rail 16 to a hose grip 36 (such as a KELLEMS hose grip) preferably having a mesh-like structure and depicted schematically in FIG. 1 for purposes of simplification. A final hose segment 24d is connected at an inlet end of hose 24 to a coupling 38 in turn connected to a water source (not illustrated) via a pipe 40. Coupling 38 is in the form of a T, whereby an electrical line 42 may be introduced into hose 24 to extend longitudinally therethrough for supplying electrical power to the carriage. Electrical line 42 is connected at an input end to a GFI switch 43.

Figure 8:
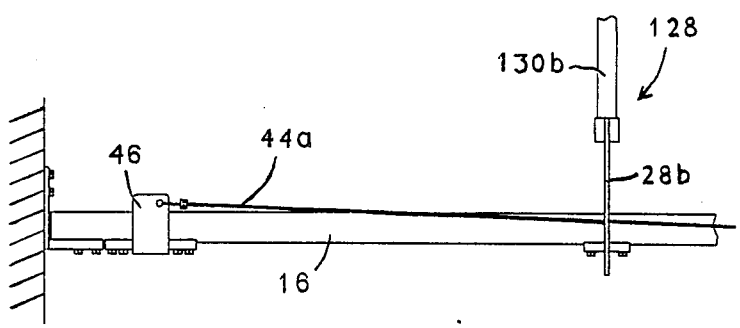
FIG. 8 is a side elevational view of the rear end portion illustrated in FIG. 7, taken from an opposite side.

Hose 24 is maintained in tension by a cable 44 connected at one end to a fixed support bracket 46 (FIGS. 1 and 8) and at an opposite end to carriage 10 in the area of hose outlet coupling 22. A first segment 44a of tension cable 44 extends from fixed support bracket 46 to hosecar 30 parallel to rail 16, while a second cable segment 44b extends across the hosecar perpendicularly to rails 16 and 18. A third cable segment 44c extends from hosecar 30 parallel to rail 18 to a pulley 48 mounted at one end of rail 18. A fourth cable segment 44d then extends parallel to rail 18 from pulley 48 to another pulley 50 located at the end of rail 18 opposite pulley 48. A fifth, terminal, segment 44e of cable 44 extends to carriage 10 from pulley 50.

At hosecar 30, cable 44 is partially wound about and deflected by a first pulley 52 which is disposed between cable segments 44a and 44b. Cable 44 is also partially wound about and deflected through a 90° angle by second pulley 54 located between cable segments 44b and 44c. Pulleys 52 and 54 are rotatably mounted to hosecar 30 (see FIG. 4). Cable segment 44d is supported at spaced intervals along the length of rail 18 by cable pulleys 56, shown in FIG. 5.

The layout of cable 44 is designed to counterbalance the forces exerted on hosecar 30 by hose 24. Cable 44 serves to maintain hose 24 in a constant state of a predetermined degree of tension. Upon movement of carriage 10 through a distance x, hosecar 30 moves a distance x/2 in the same direction. Accordingly, although carriage 10 has a range of motion substantially equal to the length of rails 16 and 18, hosecar 30 only moves through half that distance, i.e., between the center of the carriage travel path and the one end of rails 16 and 18.

Figure 3:
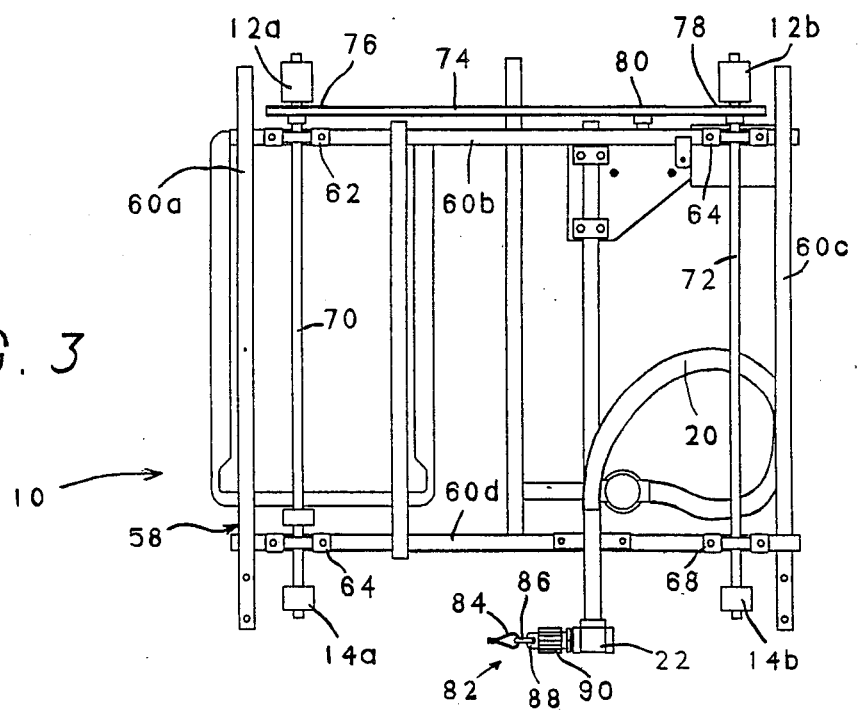
FIG. 3 is a partial top view of the carriage of FIG. 1, showing selected details thereof.

FIG. 3 shows more details of carriage 10 than are visible in FIG. 1. Nevertheless, FIG. 3 shows only the basic superstructure or frame 58 which carries the operative assemblies of the carriage, such as water distribution manifolds (not illustrated), computer control (not illustrated) and associated sensors and warning devices (not illustrated). The operative assemblies supported by carriage 10 will be readily understood by one skilled in the art familiar, for example, with the teachings of U.S. Pat. No. 4,723,714, the disclosure of which is hereby incorporated by reference.

Carriage superstructure 58 includes four principal members 60a, 60b, 60c, and 60d attached to one another in a rectangular configuration. Cross member 60b supports bearings 62 and 64, while cross member 60d supports bearings 66 and 68. A first axle 70 is rotatably mounted to carriage superstructure 58 via bearings 62 and 66, while a second axle 72 is rotatably secured to the superstructure via bearings 64 and 68. Axle 70 carries rollers 12a and 14a, while rollers 12b and 14b are fixed to opposite ends of axle 72. Axles 70 and 72, and thus rollers 12a, 12b, 14a and 14b, are rotated via a belt 74 drivingly engaging a pair of pulleys 76 and 78 each fastened to a respective axle 70 and 72. As shown in FIG. 1, rollers 12a and 12b engage rail 16, while rollers 14a and 14b contact rail 18, whereby a rotation of the rollers causes carriage 10 to move along the rails. Belt 74 is driven by a motor (not illustrated) via another pulley 80.

As depicted in FIG. 3, coupling 22 carries a connector assembly 82 which receives an end of cable 44. The connector assembly includes a loop 84, a ring 86 disposed in a plane oriented essentially perpendicularly to the plane of loop 84, a tongue 88 and a tightening component 90. The tension in cable 44 can be adjusted within limits by revolving tightening component 90.

Figure 4:
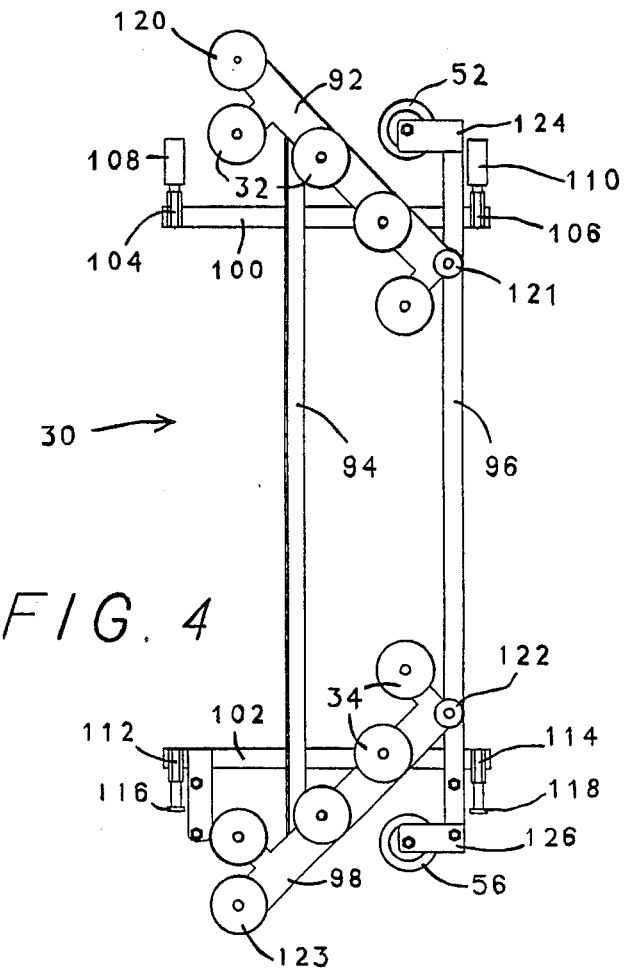
FIG. 4 is a top view of the hosecar of FIG. 1.

FIG. 4 is an enlarged view of hosecar 30 of FIG. 1. Hosecar 30 includes a first set of pulleys 32 disposed in an arcuate array, each of the pulleys being rotatably mounted to a support bracket 92 in turn fastened to a pair of longitudinal frame members 94 and 96. Hosecar 30 also includes a second arcuate array of rollers 34 rotatably mounted to a support bracket 98 in turn fixed to longitudinal frame members 94 and 96. Frame members 94 and 96 are each connected at opposite ends to a pair of cross members 100 and 102. Cross member 100 supports two bearings 104 and 106 by which two rollers or wheels 108 and 110 are rotatably mounted to the hosecar. Cross member 102 likewise carries two bearings 110 and 114 by which two additional rollers or wheels 116 and 118 are rotatably mounted to the hosecar. During motion of hosecar 30 along the track defined by rails 16 and 18 (FIG. 1), wheels 108 and 110 roll along rail 16, while wheels 116 and 118 roll along rail 18.

It is to be noted that hosecar 30 is not provided with a motor or other rotary power source for driving wheels 108, 110, 116 and 118. Instead, hosecar 30 moves in response to a slight imbalance between the forces exerted on the hosecar by hose 24 and cable 44. Cable 44 exerts on the hosecar a force directed along the path of the rails and essentially directly opposed to a force exerted on the hosecar by hose 24. Accordingly, hosecar 30 moves to the left in FIG. 1 when the force exerted on the car by hose 24 is greater than the force exerted on the car by cable 44. Similarly, hosecar 30 moves to the right in FIG. 1 when the force exerted on the hosecar by cable 44 is greater than the force exerted by hose 24. The motion of hosecar 30 is thus caused by the motor (not illustrated) which is located on carriage 10 and which rotates pulley 80 (FIG. 1).

Hosecar 30 is provided with four additional pulleys 120-123 rotatably disposed on brackets 92 and 98 for rollably clamping hose 24 to rollers 32 and 34. In addition, cable pulleys 52 and 54 are rotatably secured to respective arms 124 and 126 at the ends of frame member 96.

As shown in FIG. 5, a support frame or rail hanger 128 comprises a pair of inwardly facing C-shaped hangers 28a and 28b each fixed to the lower end of a respective vertical bar 130a and 130b in turn connectable at their upper ends to a greenhouse roof structure (not illustrated). The C-shaped hangers 28a and 28b are connected to one another by a horizontal brace 132. C-shaped hangers 28a and 28b are provided at their lower ends with angle elements 134a and 134b for holding rails 18 and 16, respectively. As heretofore described with reference to FIG. 1, C-shaped hanger 28a carries a roller 26 for rollingly supporting hose 24. That hanger also carries, along an upper arm, a cable pulley 136 for supporting and guiding a portion of tension cable 44.

Figure 6:
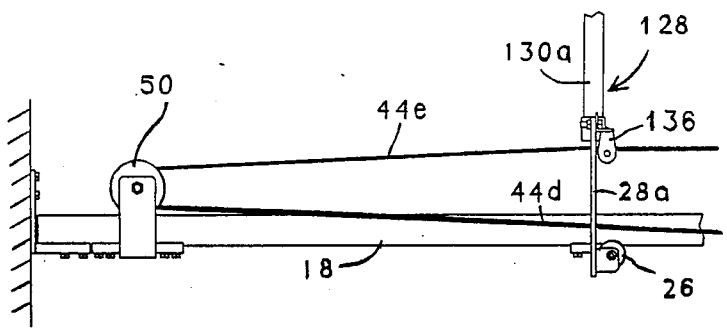
FIG. 6 is a side elevational view of a portion of a forward end of the greenhouse watering system of FIG. 1.
Figure 7:
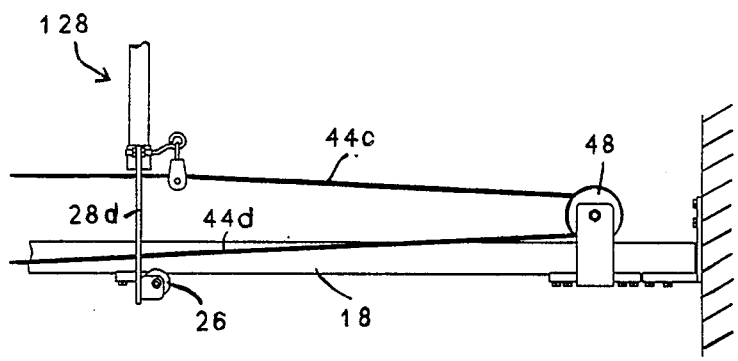
FIG. 7 is a side elevational view of a portion of a rear end of the greenhouse watering system of FIG. 1.

As depicted in FIGS. 6 and 7, cable segments 44c and 44e engage cable pulleys 136. Cable segment 44d passes along a lower path and is supported and guided, along a part of its extent by hose rollers 26. FIG. 1 illustrates only a few rail hanger assemblies 128 for purposes of simplifying the drawing. For the same reason, the lengths of rails 16 and 18 in FIG. 1 are greatly shortened.

Figure 9:
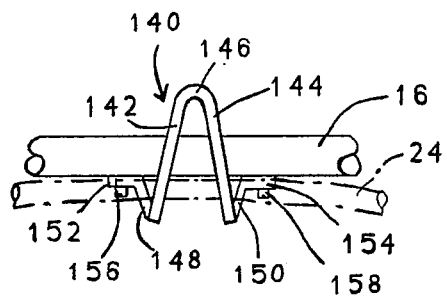
FIG. 9 is a partial side elevational view of a rail on which the carriage and hosecar of FIGS. 1, 3 and 4 ride, showing a hook member for supporting the water delivery hose.
Figure 10:
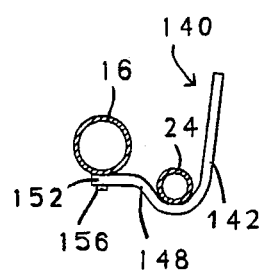
FIG. 10 is a partial cross-sectional view taken along line X—X in FIG. 9.

As illustrated in FIGS. 9 and 10, rail 16 carries a plurality of spaced hook members 140 for supporting hose segment 24c (FIGS. 1 and 2). The hook members are omitted from FIG. 1 for purposes of simplifying that drawing figure. Each hook member 140 includes two main leg portions 142 and 144 connected by a bight section 146. At their ends opposite bight section 146, legs 142 and 144 are connected to respective partially arcuate extensions 148 and 150 in turn provided at their free ends with outwardly extending fingers 152 and 154. Fingers 152 and 154 are attached to an underside of rail 16 via screws or bolts 156 and 158. Hook members 140 may also serve to support cable segment 44a.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehen-

What is claimed is:

1. A sprinkler watering system for a greenhouse, comprising in combination:
   a first horizontal rail and a second horizontal rail extending parallel to one another to define an elevated path in the greenhouse;
   a carriage movably mounted to said rails;
   a fluid outlet disposed at a substantially midway point along said path;
   fluid transfer means for guiding fluid from said fluid outlet to said carriage, said fluid transfer means including a hose connected at one end to said fluid outlet and at an opposite end to said carriage, said hose having a first end portion extending from said fluid outlet along said first rail and a second end portion extending to said carriage along said second rail, said hose further having a middle portion connecting said first end portion to said second end portion;
   first support means disposed along said first rail for supporting said first end portion of said hose;
   second support means including a plurality of roller members spaced from one another along said second rail for rollably supporting said second end portion of said hose;
   third support means for carrying said middle portion of said hose, said third support means including a hosecar movably mounted to said rails; and
   tensioning means for maintaining tension on said hose, said tensioning means including a cable operatively connected to said hosecar to exert thereon a force directed along said path and essentially directly opposed to a force exerted on said hosecar by said hose.

2. The system defined in claim 1, further comprising deflection means on said hosecar for deflecting said hose from a first orientation occupied by said first end portion of said hose to a second orientation occupied by said middle portion of said hose and for deflecting said hose from said second orientation to a third orientation occupied by said second end portion of said hose, so that said middle portion of said hose is disposed substantially perpendicularly to said first end portion and said second end portion.

3. The system defined in claim 2 wherein said cable is partially wound about rollers on said hosecar.

4. The system defined in claim 3 wherein said cable has one end fixedly attached at an end of one of said first rail and said second rail and an opposite end secured to said carriage to exert thereon a force directed along said path and essentially directly opposed to a force exerted on said carriage by said hose.

5. The system defined in claim 2 wherein said cable has a first segment extending along one of said first rail and said second rail from a first stationary point at one end of said one of said first rail and said second rail, a second segment extending across said hosecar substantially parallel to said middle portion, a third segment extending along the other of said first rail and said second rail to a second stationary point at an end of said other of said first rail and said second rail, a fourth segment extending from said second stationary point along said other of said first rail and said second rail to a third stationary point at another end of said other of said first rail and said second rail, and a fifth segment extending parallel to said other of said first rail and said second rail from said third stationary point to said carriage.

6. The system defined in claim 5 wherein said first rail constitutes said one of said first rail and said second rail, said second rail constituting said other of said first rail and said second rail.

7. The system defined in claim 6 wherein said first segment of said cable is supported by pulley members disposed along said first rail, said third and said fifth segment are supported by pulley members disposed along said second rail and said fourth segment is partially supported by said second support means.

8. The system defined in claim 5 wherein said cable is partially wound about pulleys at said first stationary point, said second stationary point and said third stationary point.

9. The system defined in claim 2 wherein said deflection means includes two arcuately disposed arrays of spaced rollers.

10. The system defined in claim 1 wherein said first support means includes a plurality of hook members spaced from one another along said first rail.

11. The system defined in claim 1 wherein said cable is partially wound about rollers on said hosecar.

12. The system defined in claim 1 wherein said cable has one end fixedly attached at an end of one of said first rail and said second rail and an opposite end secured to said carriage to exert thereon a force directed along said path and essentially directly opposed to a force exerted on said carriage by said hose.

13. The system defined in claim 1, further comprising additional support means for carrying said first rail and said second rail, said additional support means including a plurality of pairs of drop pipes, said pairs being spaced from one another along said path, said additional support means further including a multiplicity of C-shaped hangers attached to said drop pipes, said rails and said roller members being secured to said C-shaped hangers.

14. A sprinkler watering system for a greenhouse, comprising in combination:
   a first horizontal rail and a second horizontal rail extending parallel to one another to define an elevated path in the greenhouse;
   a carriage movably mounted to said rails;
   a fluid outlet disposed at a substantially midway point along said path;
   fluid transfer means for guiding fluid from said fluid outlet to said carriage, said fluid transfer means including a hose connected at one end to said fluid outlet and at an opposite end to said carriage, said hose having a first end portion extending from said fluid outlet along said first rail and a second end portion extending along said second rail to said carriage, said hose further having a middle portion connecting said first end portion to said second end portion;
   first support means including a plurality of hook members disposed along said first rail for supporting said first end portion of said hose;
   second support means including a plurality of roller members spaced from one another along said second rail for rollably supporting said second end portion of said hose;
   third support means for carrying said middle portion of said hose, said third support means including a hosecar movably mounted to said rails;
   deflection means on said hosecar for deflecting said hose from a first orientation occupied by said first end portion of said hose to a second orientation occupied by said middle portion of said hose and for deflecting said hose from said second orientation to a third orientation occupied by said second end portion of said hose, so that said middle portion of said hose is disposed substantially perpendicularly to said first end portion and said second end portion;

tensioning means for maintaining tension on said hose, said tensioning means including a cable operatively connected to said hosecar to exert thereon a force directed along said path and essentially directly opposed to a force exerted on said hosecar by said hose, said cable having a first segment extending along one of said first rail and said second rail from a first stationary point at one end of said one of said first rail and said second rail, a second segment extending across said hosecar substantially parallel to said middle portion, a third segment extending along the other of said first rail and said second rail to a second stationary point at an end of said other of said first rail and said second rail, a fourth segment extending from said second stationary point along said other of said first rail and said second rail to a third stationary point at another end of said other of said first rail and said second rail, and a fifth segment extending parallel to said other of said first rail and said second rail from said third stationary point to said carriage.

15. The system defined in claim 14 wherein said cable is partially wound about rollers on said hosecar.

16. The system defined in claim 14 wherein said cable is supported by said first support means along said first rail and partially by said second support means along said second rail.

17. The system defined in claim 16, further comprising fourth support means including a plurality of pulley members disposed along said second rail for partially supporting said cable along s id second rail.

18. The system defined in claim 17, further comprising fifth support means for carrying said first rail and said second rail, said additional support means including a plurality of pairs of drop pipes, said pairs being spaced from one another along said path, said fifth support means further including a multiplicity of C-shaped hangers attached to said drop pipes, said rails, said pulley members and said roller members being secured to said C-shaped hangers.

19. The system defined in claim 14 wherein said first rail constitutes said one of said first rail and said second rail, said second rail constituting said other of said first rail and said second rail.

20. A transport system for facilitating transfer of a continuous flow from a source to any point throughout a substantial target area, comprising:

a first horizontal rail and a second horizontal rail extending parallel to one another to define an elevated path over the target area, said source being disposed at a substantially midway point along said path;

a carriage movably mounted to said rails;

transfer means for guiding flow from said source to said carriage, said transfer means including an elongate flexible member connected at one end to said source and at an opposite end to said carriage, said flexible member having a first end portion extending from said source along said first rail and a second end portion extending to said carriage along said second rail, said flexible member further having a middle portion connecting said first end portion to said second end portion;

first support means disposed along said first rail for supporting said first end portion of said flexible member;

second support means including a plurality of roller members spaced from one another along said second rail for rollably supporting said second end portion of said flexible member;

third support means for carrying said middle portion of said flexible member, said third support means including a car movably mounted to said rails; and tensioning means for maintaining tension on said flexible member, said tensioning means including a cable operatively connected to said car to exert thereon a force directed along said path and essentially directly opposed to a force exerted on said car by said flexible member.

21. The system defined in claim 20, further comprising deflection means on said car for deflecting said flexible member from a first orientation occupied by said first end portion of said flexible member to a second orientation occupied by said middle portion of said flexible member and for deflecting said flexible ember from said second orientation to a third orientation occupied by said second end portion of said flexible member, so that said middle portion of said flexible member is disposed substantially perpendicularly to said first end portion and said second end portion.

22. The system defined in claim 21 wherein said cable is partially wound about rollers on said car.

23. The system defined in claim 22 wherein said cable has one end fixedly attached at an end of one of said first rail and said second rail and an opposite end secured to said carriage to exert thereon a force directed along said path and essentially directly opposed to a force exerted on said carriage by said flexible member.

24. The system defined in claim 21 wherein said cable has a first segment extending along one of said first rail and said second rail from a first stationary point at one end of said one of said first rail and said second rail, a second segment extending across said car substantially parallel to said middle portion, a third segment extending along the other of said first rail and said second rail to a second stationary point at an end of said other of said first rail and said second rail, a fourth segment extending from said second stationary point along said other of said first rail and said second rail to a third stationary point at another end of said other of said first rail and said second rail, and a fifth segment extending parallel to said other of said first rail and said second rail from said third stationary point to said carriage.

25. The system defined in claim 24 wherein said first rail constitutes said one of said first rail and said second rail, said second rail constituting said other of said first rail and said second rail.

26. The system defined in claim 25 wherein said first segment of said cable is supported by pulley members disposed along said first rail, said third and said fifth segment are supported by pulley members disposed along said second rail and said fourth segment is partially supported by said second support means.

27. The system defined in claim 24 wherein said cable is partially wound about pulleys at said first stationary point, said second stationary point and said third stationary point.

28. The system defined in claim 21 wherein said deflection means includes two arcuately disposed arrays of spaced rollers.

29. The system defined in claim 20 wherein said first support means includes a plurality of hook members spaced from one another along said first rail.

30. The system defined in claim 20 wherein said cable is partially wound about rollers on said car.

31. The system defined in claim 20 wherein said cable has one end fixedly attached at an end of one of said first rail and said second rail and an opposite end secured to said carriage to exert thereon a force directed along said path and essentially directly opposed to a force exerted on said carriage by said flexible member.

32. The system defined in claim 20, further comprising additional support means for carrying said first rail and said second rail, said additional support means including a plurality of pairs of drop pipes, said pairs being spaced from one another along said path, said additional support means further including a multiplicity of C-shaped hangers attached to said drop pipes, said rails and said roller members being secured to said C-shaped hangers.

* * * * *